March 4, 1952 W. A. AYRES 2,587,585

APPARATUS FOR PRODUCING STEREOSCOPIC PICTURES

Filed June 29, 1945 3 Sheets-Sheet 1

INVENTOR
Waldemar A. Ayres
BY
Blair, Curtis & Hayward
ATTORNEYS

INVENTOR
Waldemar A. Ayres
BY
Blair, Curtis & Hayward
ATTORNEYS

March 4, 1952 W. A. AYRES 2,587,585

APPARATUS FOR PRODUCING STEREOSCOPIC PICTURES

Filed June 29, 1945 3 Sheets-Sheet 3

INVENTOR
*Waldemar A. Ayres*
BY
*Blair, Curtis & Hayward*
ATTORNEYS

Patented Mar. 4, 1952 2,587,585

UNITED STATES PATENT OFFICE 2,587,585

APPARATUS FOR PRODUCING STEREOSCOPIC PICTURES

Waldemar A. Ayres, Kew Gardens Hills, N. Y., assignor to The Sperry Corporation, a corporation of Delaware Application June 29, 1945, Serial No. 602,377

3 Claims. (Cl. 45—129)

This invention relates to producing pictures or images, and more particularly to an apparatus for producing stereoscopic pairs or sets of views.

An object of this invention is to provide for reproducing an image or view which is in parallax with another image or view, or which is otherwise offset from the other image or view in a predetermined manner. A further object is to provide a method and apparatus for producing one or more views of a stereoscopic pair or set in a simple and straightforward manner. A still further object is to provide for the simultaneous production of the two or more views of a stereoscopic pair. A further object is to provide an apparatus of the above character wherein a view may be reproduced or outlined in a simple manner so that the reproduced or outlined view may be used as one view of a stereoscopic pair or set. Another object is to provide apparatus of the above character which is simple and sturdy in construction and which is easy to use. These and other objects will be in part obvious and in part pointed out below.

In this specification and the accompanying drawings I have shown and described a preferred embodiment of my invention and a modification thereof; it is to be understood that these are not intended to be exhaustive nor limiting of the invention, but on the contrary are given for purposes of illustration in order that others skilled in the art may fully understand the invention and the principles thereof and the manner of applying it to practical use so that they may modify and adapt it in various forms, each as may be best suited to the conditions of a particular use.

As conducive to a clear understanding of the invention, it is pointed out that a great deal of effort has been expended in attempts to produce stereoscopic pictures. Many complicated systems and viewing arrangements have been provided for this purpose. For example, with some devices the artist produces the second view of a stereoscopic pair by gazing at one view with one eye and drawing a "ghost-image" viewed by the other eye. In other systems the mathematical relationship between the various elements of the two views of a pair is calculated and then the views are produced in accordance with the calculations. However, this procedure is impractical because it is too involved and too difficult for the ordinary artisan to practice commercially; furthermore, the cost is usually prohibitive.

Very satisfactory stereoscopic pictures have been made photographically; for example, by taking two pictures from spaced points with a single camera or by taking the pictures simultaneously with a double-camera arrangement. These systems have obvious practical limitations, one of the most important of which being that in practice both of the negatives for the pictures of the stereoscopic pair must be exposed at the same time; that is, both pictures must be made from the original three-dimension object. Thus, these systems do not lend themselves to use in producing or reproducing three-dimension drawings or other artistic creations. It is an object of the present invention to provide for the production or reproduction of the two or more views of a stereoscopic pair or set in a simple and efficient manner from a single picture, drawing, or other view, and in such a manner as to avoid the objectionable features of the prior art.

In accordance with the present invention, one or more of the views of the stereoscopic pair may be produced from a single view, or both or all of the views may be produced simultaneously by an artist without any original view; that is, an artist may produce the two or more views of the stereoscopic pair or set in substantially the same manner in which he normally produces a single two-dimension picture. Furthermore, in practicing the invention the artist may produce or reproduce multi-colored views, for example, by making an outline of the views and then filling in the outlines with the proper colors.

Figure 1:
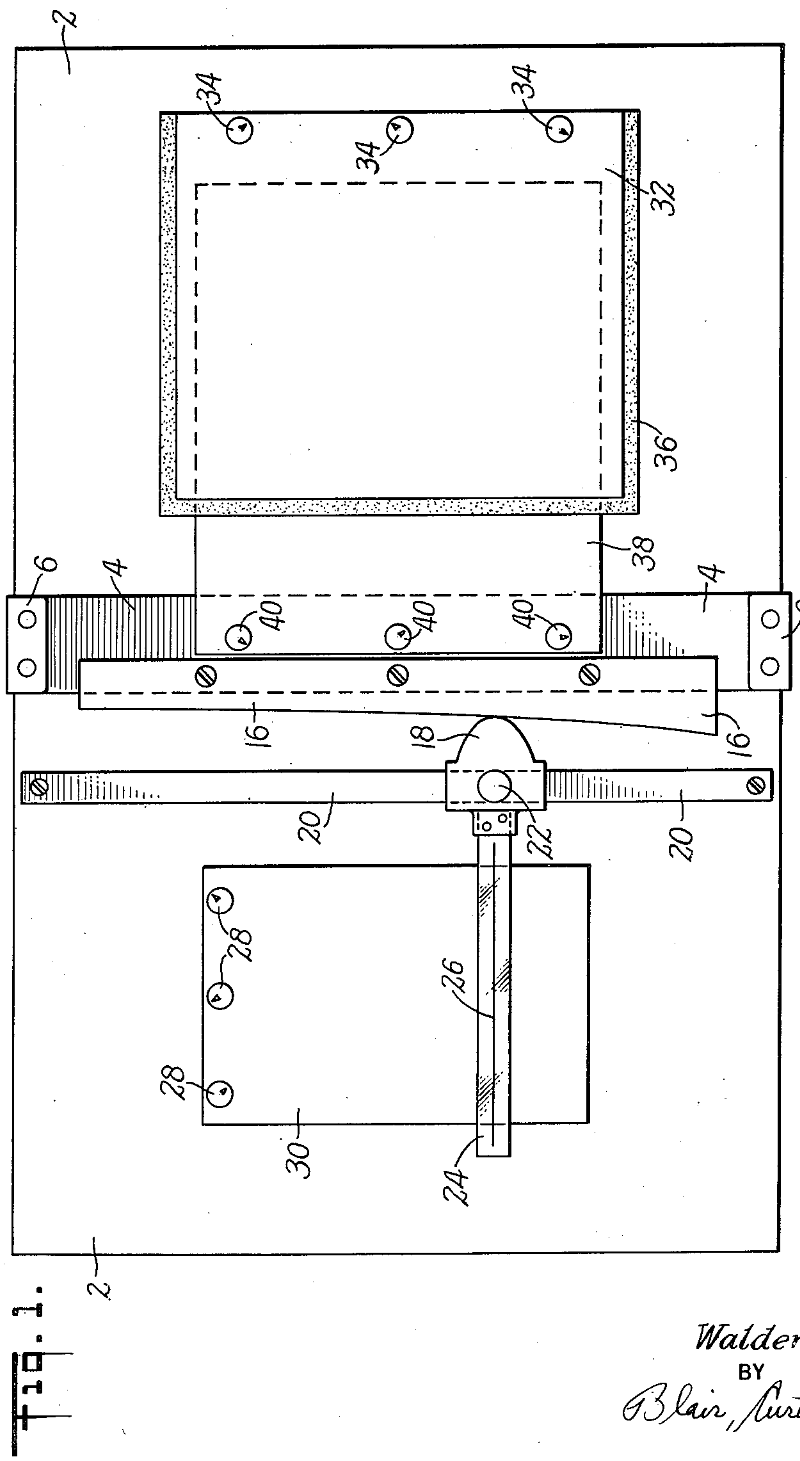
Figure 1 is a top-plan view of a drawing board for producing stereoscopic pictures.
Figure 2:
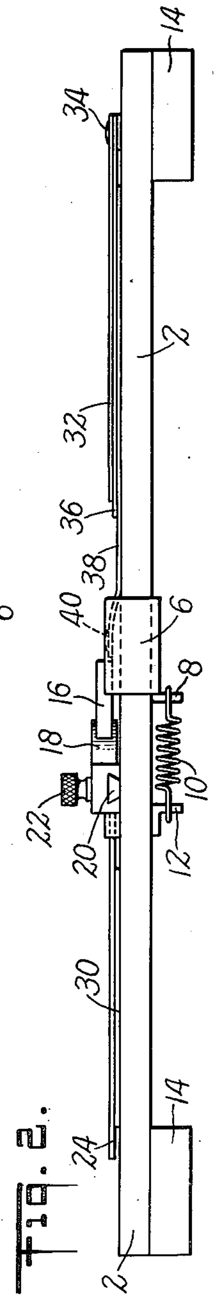
Figure 2 is a front elevation with the thickness of the sheets of paper exaggerated.

Referring to Figures 1 and 2 of the drawings, a rectangular drawing board 2 is provided near its center with a transverse slide bar 4 which is mounted at its ends on a pair of slide brackets 6 which are attached to the bar 4 and hold the bar against the board. As shown in Figure 2, clamps 6 extend beneath the board and each is provided with an ear 8 to which is attached one end of a tractile spring 10, the other end of which is attached to a bracket 12 fixed to the bottom of drawing board 2. Thus, bar 4 has limited sliding movement and is urged to the left by springs 10 which are under tension. Drawing board 2 is supported at its ends by a pair of boards 14.

Bar 4 (Figure 1) carries a cam strip 16 which has along its left-hand side a cam surface which is held against a slidable cam follower 18. Cam follower 18 is slidably mounted on slide strip 20 clamped to drawing board 2 in parallel relationship to bar 4. Slide strip 20 is undercut at its edges (see Figure 2) and cam follower 18 has a groove shaped to mate the slide strip so that a dovetail slide is provided. A thumb screw 22 is threaded in the top of cam follower 18 above slide strip 20 and may be tightened to clamp the cam follower to the slide strip in any desired position. Rigidly attached to cam follower 18 and extending to the left at right angles to slide strip 20 is a transparent guide bar 24 which has a longitudinal center line 26. Thus, cam follower 18 and guide bar 24 form a "T-square" arrangement. Beneath guide bar 24 and removably attached to drawing board 2 by thumb tacks 28 is a depth-guide sheet 30 the purpose of which will be explained below.

Mounted on the right-hand side of the drawing board and held in place by thumb tacks 34 is an original picture sheet 32, and beneath sheet 32 is a carbon sheet 36 which is also held by thumb tacks 34. Lying beneath the carbon sheet (see also Figure 3) is a second picture sheet 38 which is attached along its left-hand edge by thumb tacks 40 to bar 4. As indicated above, bar 4 is biased to the left by springs 10 against cam follower 18, and when cam follower 18 is moved along slide strip 20, cam strip 16 rides on the cam follower and the second picture sheet 38 slides transversely. That is, if the cam follower is moved toward the bottom of the figure, sheet 38 is moved to the right, and if the cam follower is moved toward the top of the figure, sheet 38 is moved to the left.

Figures 4, 5:
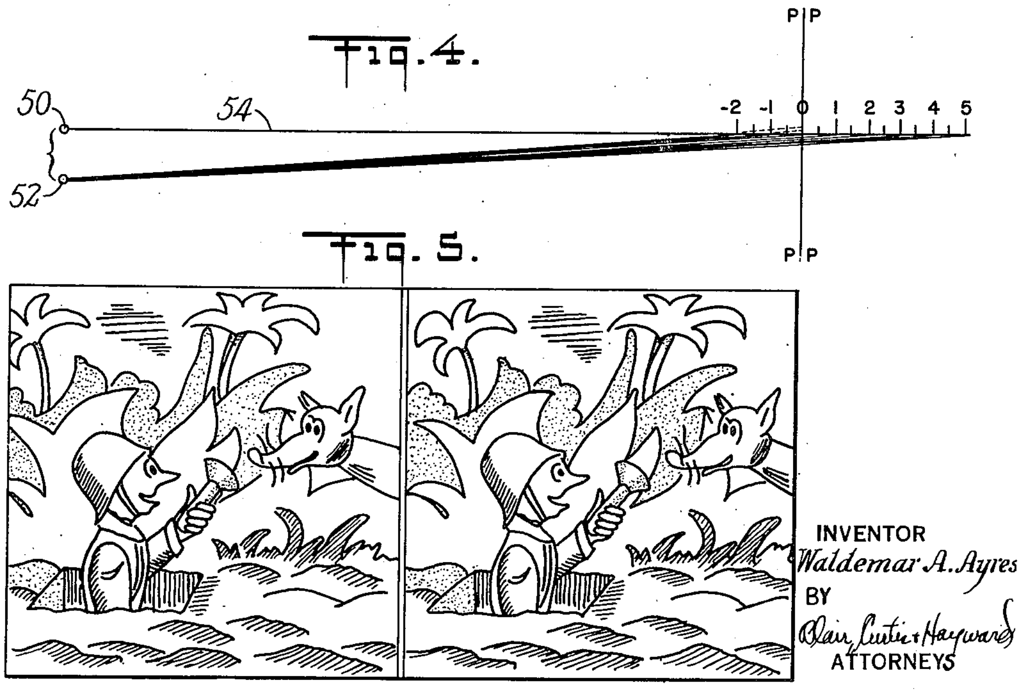
Figure 4 is a chart used to explain the invention.
Figure 5 is a stereoscopic pair produced by the apparatus shown in Figure 1.

In explaining this invention the stereoscopic pair of Figure 5 will be referred to. It is assumed that an original picture such as the left-eye view at the left of Figure 5 is to be used as the left-eye view of the stereoscopic pair, and the right-eye view shown at the right of Figure 5 was produced from this left-eye or original view. In accordance with the invention, it is possible to produce a stereoscopic pair wherein the objects appear to be in front of and behind the picture plane.

Referring to Figure 4, the left-eye and right-eye positions are represented respectively at 50 and 52, and the left-eye view of Figure 5 is represented in plan at the right of Figure 4. In Figure 4 the plane of the picture is represented by the line P—P. Intersecting line P—P is a line 54 which represents a plane normal to the picture plane and passing through the left-eye position 50. Points along line 54 are marked to indicate distances in front of and to the rear of the picture plane. Accordingly, the picture plane is marked "0" with the designations —1 and —2 in front of the picture plane and the designations 1 to 5 to the rear of the picture plane.

When viewed from the left-eye position 50, objects in the plane of line 54 appear one behind another, but when viewed from the right-eye position 52, these objects appear displaced one from another, somewhat in a side-by-side relationship. This is due to the parallax which also causes objects at the front of the view to be displaced from one another more than objects at the rear of the view. Thus, the displacement between an object at —2 and another object at —1 is much greater than that between two objects similarly displaced at the rear of the view. In order to bring out this relationship, lines have been drawn between the right-eye position 52 and each of the points —2 to 5. The parallax displacement between each point and the next adjacent point is found by measuring the distance between where their lines cross line P—P. In producing a right-eye view from a left-eye view each object in the view is given a displacement from the picture plane corresponding to this parallax displacement as shown in Figure 4.

As stated above, the right-eye view of Figure 5 is so drawn with respect to the left-eye view that objects in front of plane P—P are displaced to the left, and objects to the rear are displaced to the right. The right-eye view of Figure 5 is a reproduction of a view made on a drawing board such as that of Figures 1 and 2, and the use of this board will be explained by reference to the manner in which this right-eye view was produced. Accordingly, the left-eye view appears on sheet 32, and the right-eye view is produced by tracing through the carbon paper 36 onto sheet 38. In making this tracing, each object is traced using a displacement corresponding to that indicated in Figure 4; that is, the objects at the bottom of Figure 5, which is the front of the picture, are displaced to the left, whereas, objects in the picture plane are given no displacement, and objects at the back of the picture are displaced to the right. The contour of the cam surface on cam-strip 16 represents the parallax displacement along the line 54 between the points —2 and 5; this cam surface is produced by plotting a curve of the parallax displacement which is calculated in the manner outlined in the discussion of Figure 4. To obtain the proper displacement with the drawing board of Figure 1, a plan-view sketch, or depth-guide sheet 30 is produced which represents the relative positions of the various objects appearing in the view; that is, at the bottom of the sheet which represents the front of the picture are some small clumps of foliage and behind this are the fox-hole, the soldier, and the fox. Immediately behind these some more foliage appears, and in the background are two palm trees; and the sky is at the very back of the picture.

With depth-guide sheet 30 in place, cam-follower 18 is moved so that line 26 is directly over an object being traced, and the cam surface of cam-strip 16 is such that sheet 38 is given the right displacement for that object. For example, the objects which are most prominent in the picture may be traced first so that the other objects may be filled in around them, and with this in view, the first step is to position the cam follower with line 26 at the near side of the soldier. The soldier is then traced, and all objects to the right and left of him are traced. The cam follower is then moved from one object to another, and in each position the object is traced until all of the main objects are reproduced on sheet 38. Thereafter, shading and connecting lines are added to sheet 38 by lifting sheet 32 and the carbon sheet 36. Furthermore, during the tracing process, the original sheet and the carbon may be lifted to view the results and to add lines.

Under some circumstances it is impractical to trace an entire object or even a single line because the various parts of the object or line should be displaced different amounts. For example, the side lines of the foxhole extend transversely of the picture plane, and these should not be reproduced in their entirety with a single displacement of the sheets. In reproducing these lines, the artist plots the two ends of the line through the tracing paper, properly positioning the cam-follower so that line 26 is at the proper end of the line each time a point is plotted, and he then folds back the original sheet 32 and carbon sheet 36 and draws the line with a straightedge. With curved lines and irregular objects several points may be plotted and the lines may then be drawn freehand or with proper curves. The practical carrying out of this method depends upon the skill of the artist and the accuracy desired.

Figure 3:
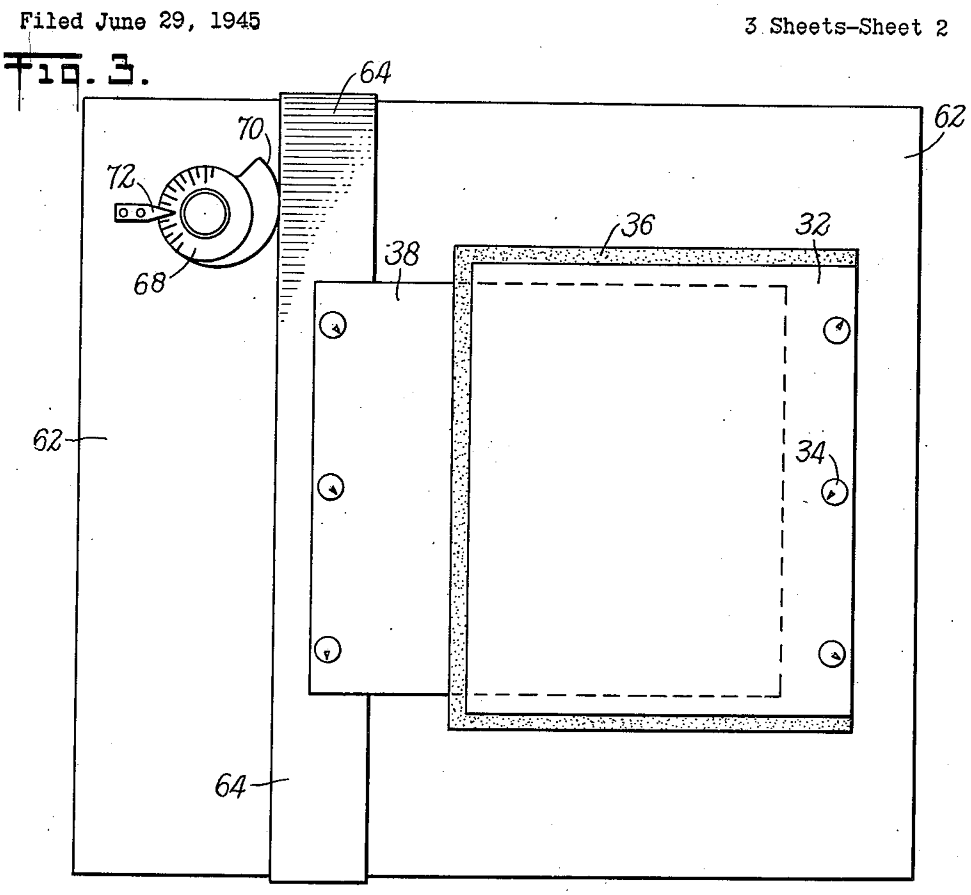
Figure 3 is a view similar to Figure 1 showing another embodiment of the invention.

In the embodiment of Figure 3, a drawing board 62 has slidably mounted thereon a slide bar 64 which carries the sheet 38 in the same manner as does bar 4. An original picture sheet 32 and a carbon sheet 36 are removably attached to the drawing board by thumb tacks 34. A graduated cam 68 is rotatably mounted on the board, and the cam surface 70 of cam 68 is a spiral cam corresponding to the cam surface of cam 16. Bar 64 is not urged to the left by spring means as in the embodiment of Figures 1 and 2 but is free to slide. However, during use, bar 64 is held against the cam surface 70; cam 68 is indexed, and a fixed pointer 72 designates the setting of the cam. Here the index corresponds to the position numbers of Figure 4, and the cam displacement corresponds to the parallax displacement of the corresponding points with respect to line 54. Board 62 of Figure 3 is used in a manner similar to the manner in which the board of Figures 1 and 2 is used. However, with board 62 the artist estimates the relative depth in the picture of the object which is being traced and he sets cam 68 to correspond with this relative depth. During the tracing, bar 64 is held to the left against cam surface 70, and after each object is traced, the cam is reset to the proper index number for the next object.

Figure 6:
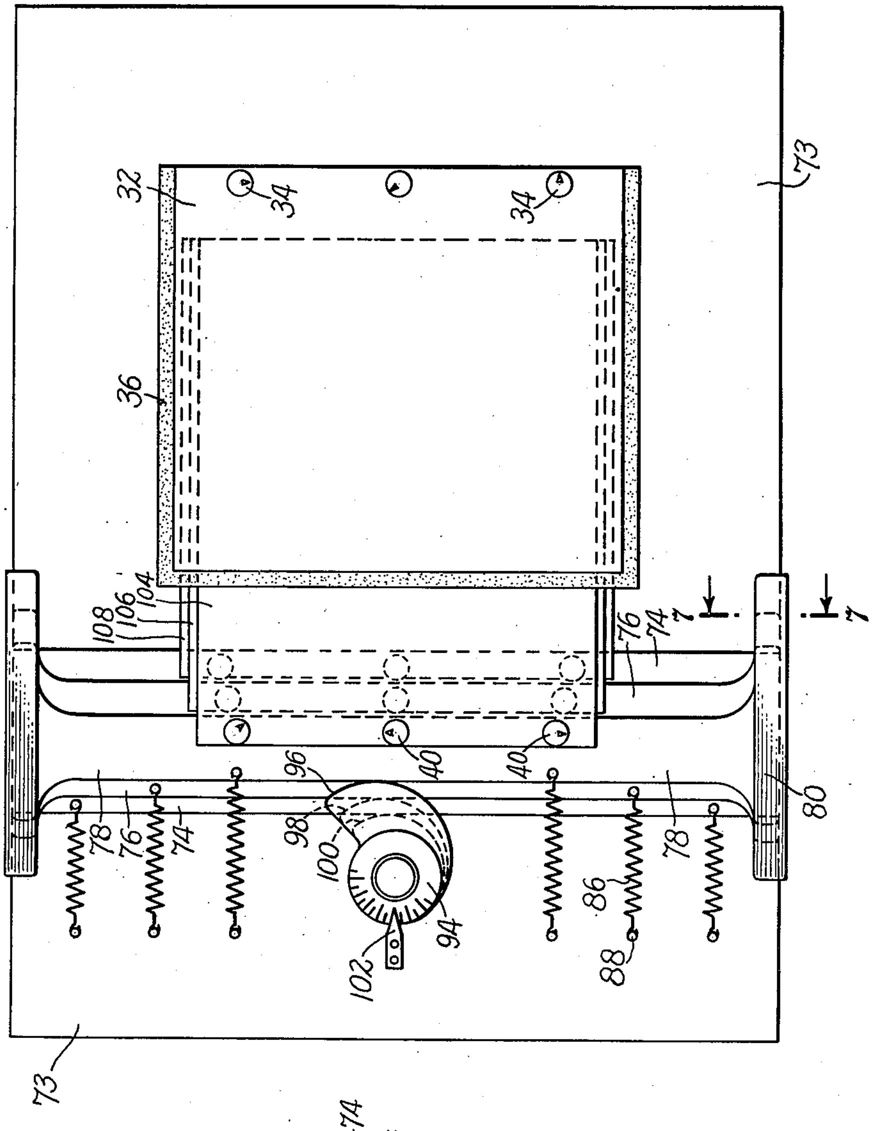
Figure 6 is a view similar to Figures 1 and 3 but showing another embodiment of the invention; and, Figure 7 is a sectional view on the line 7—7 of Figure 6.
Figure 7:
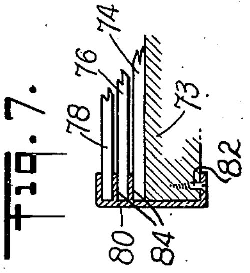

Under some circumstances it is desirable to provide three or more views to form a stereoscopic set as distinguished from a stereoscopic pair, and this may be accomplished using the embodiment of Figure 6. In this embodiment, a drawing board 73 is provided with three slide bars 74, 76, and 78 stacked together and slidably held at their ends by a pair of guide brackets 80 (see also Figure 7). Each of the guide brackets is rigidly attached to board 73 by a plurality of screws 82, and between the slide bars are guide strips 84 integral with brackets 80. Each slide bar is urged to the left by a pair of springs 86 attached to the respective ends of the slide bar and each spring being held by a bracket 88 mounted on board 73. Slide bars 76 and 78 are enlarged at their ends and all of the slide bars are snugly received in brackets 80 so that the slide bars slide back and forth without any canting movement.

Rotatably mounted on the drawing board and at the left of the slide bars is a graduated cam 94, which is similar to cam 68 of Figure 3 but which has three stepped concentric spiral cam surfaces 96, 98 and 100 (the latter two of which are shown in broken lines). A fixed pointer 102 indicates the index setting of the cam. Slide bar 74 rests against cam surface 100 and slide bars 76 and 78 respectively rest against cam surfaces 98 and 96. The contour of cam surface 96 is the same as that of cam surface 70 in Figure 3, and cam surfaces 98 and 100 are concentric with cam surfaces 96 but the relative displacement along any radial line is proportionately less. At the right the drawing board carries a picture sheet 32 and carbon sheet 36 both removably attached by thumb tacks 34. The three slide bars 74, 76 and 78 respectively carry blank sheets of drawing paper 108, 106 and 104, each sheet being removably attached by thumb tacks 40; beneath each of sheets 104 and 106 is a carbon sheet which does not appear in the drawing.

With this embodiment the operation is similar to that of the embodiment of Figure 3. However, instead of producing one view as in Figure 3, three views are produced wherein the same objects in the different views are given proportional but different displacements. That is, the objects in the view on sheet 104 are displaced the same as the objects on sheet 38 in Figure 3, but the same objects on sheet 106 are displaced approximately two-thirds as much as the corresponding objects on sheet 38; and the displacement of these same objects on sheet 108 is one-third as much. Thus, including the original picture on sheet 32, there are four views with the objects displaced in a parallax arrangement in equal stepped proportions. The stereoscopic set consisting of these four views may be used to produce somewhat the equivalent of a continuous scan stereoscopic picture. The exact procedure for using this stereoscopic set is the subject matter of another application for Letters Patent. However, briefly stated, the various views of the set are combined into a single stereoscopic picture with the respective portions of the views properly displaced. This stereoscopic picture is then observed in the same manner that a stereoscopic pair on lenticulated film is viewed but has greater viewing range both as to angle and as to distance. When extreme fidelity is desired a larger number of views may be produced such for example as ten or twenty views. For such an arrangement, cam 94 has a correspondingly larger number of cam surfaces, and the sheets upon which the views are produced are extremely thin.

In accordance with this invention, both views of a pair or all the views of a set may be produced simultaneously; that is, the artist may produce a tracing which corresponds to the right-eye view while he is making the original view as a left-eye view. In doing this, the artist follows a procedure such as that outlined above, changing the setting on the drawing board each time that there is a change in the depth of the object. With most types of views, at least some lines must be placed on the different views individually, but one view may be used by the artist as a guide while working on the other view, and no difficulty is encountered by an experienced artist. It should be noted that with this invention it is possible to reproduce involved geometrical figures and drawings in outline; when desired such reproductions may be colored using the outlines as guides. Thus, stereoscopic pairs of drawings and layouts may be obtained without difficulty.

When it is desirable to provide stereoscopic paintings, outlines are made upon different sheets as described above. The artist then uses the outlines as guides and paints one, two or more similar views showing slightly different parallax displacements for the objects.

As various embodiments may be made of the above invention and as changes might be made in the embodiment above set forth, it is to be understood that all matter hereinbefore set forth or shown in the accompanying drawings is to be interpreted as illustrative and not in a limiting sense.

I claim:

1. In apparatus of the character described, the combination of, a drawing board, mounting means for a plurality of sheets upon which views are to be produced, a depth gauge to indicate to the operator the apparent depth of substantially each object in the view, cam means presenting a cam surface the contour of which varies with the depth indication in accordance with the parallax displacement of the particular object, and means to displace one of the sheets in accordance with the portion of said cam surface which is presented.

2. In apparatus of the character described, the combination comprising a drawing board, a cross bar member adapted to have a first sheet of paper affixed thereto and positioned thereby, said member being mounted to move transversely of said board and subdividing the same into two areas, one area being adapted to contain said first sheet upon which a view is to be produced and the other area being adapted to fixedly contain a depth guide viewing sheet, cam means mounted on said cross bar and presenting a cam surface having a contour correlated with the parallax displacement of various objects on said depth guide viewing sheet, cam-engaging means mounted to move longitudinally of said board, and a gauge member affixed to said cam-engaging means, said gauge member being movable across said depth guide viewing sheet by an operator to positions overlying chosen objects thereon, longitudinal movement of said gauge member over said depth guide viewing sheet causing transverse movement of said cross bar and first sheet in amounts dependent upon the actual parallax displacement of the various objects corresponding to those appearing in the depth guide viewing sheet.

3. Apparatus as claimed in claim 2, in which said gauge member is a transparent piece having an indicating line thereon situated perpendicular to said cross bar member.

WALDEMAR A. AYRES.

REFERENCES CITED

The following references are of record in the file of this patent:

UNITED STATES PATENTS

| Number | Name | Date |
|---|---|---|
| 230,008 | Harden | July 13, 1880 |
| 495,157 | Johnson | Apr. 11, 1893 |
| 697,764 | Williams | Apr. 15, 1902 |
| 1,208,024 | Sinclair | Dec. 12, 1916 |
| 1,289,342 | Witte | Dec. 31, 1918 |
| 1,440,993 | Hasbrouck et al. | Jan. 2, 1923 |
| 1,484,702 | Dowling | Feb. 26, 1924 |
| 1,592,034 | Macy | July 13, 1926 |
| 2,057,051 | Owens | Oct. 13, 1936 |
| 2,283,777 | Wendling | May 19, 1942 |
| 2,381,197 | Zalkind | Aug. 7, 1945 |

FOREIGN PATENTS

| Number | Country | Date |
|---|---|---|
| 23,368 | Switzerland | Mar. 12, 1901 |
| 85,090 | Switzerland | Jan. 25, 1917 |
| 326,773 | Great Britain | Mar. 18, 1930 |

OTHER REFERENCES

O. N. Rood, "On a Method of Producing Stereographs by Hand," pages 71–74, American Journal of Science and Art, second series, vol. 31, 1861.